United States Patent [19]

Boggs et al.

[11] Patent Number: 4,481,626
[45] Date of Patent: Nov. 6, 1984

[54] TRANSCEIVER MULTIPLEXOR

[75] Inventors: David R. Boggs, Palo Alto; John F. Shoch, Stanford, both of Calif.

[73] Assignee: Xerox Corporation, Stamford, Conn.

[21] Appl. No.: 375,055

[22] Filed: May 5, 1982

[51] Int. Cl.³ .............................................. H04Q 9/00
[52] U.S. Cl. .................................. 370/85; 340/625.5; 370/94
[58] Field of Search .................. 370/85, 86, 89, 56; 340/825.5

[56] References Cited

U.S. PATENT DOCUMENTS

| | | | |
|---|---|---|---|
| 4,063,220 | 12/1977 | Metcalfe et al. | 340/825.5 |
| 4,259,663 | 3/1981 | Gable | 340/825.5 |
| 4,281,380 | 7/1981 | DeMesa et al. | 370/94 |
| 4,282,512 | 8/1981 | Boggs et al. | 340/825.5 |
| 4,292,623 | 9/1981 | Eswaran et al. | 370/94 |
| 4,332,027 | 5/1982 | Malcolm et al. | 370/85 |
| 4,347,498 | 8/1982 | Lee et al. | 370/94 |
| 4,464,658 | 8/1984 | Thelen et al. | 340/825.5 |

OTHER PUBLICATIONS

"The Ethernet Local Network: Three Reports", Metcalfe et al., Feb. 1980, pp. all.
"The Ethernet", Digital Equipment Corporation, Intel

FOREIGN PATENT DOCUMENTS 8,303,179 9/1983 European Patent Office

Corporation, Xerox Corporation, Sep. 30, 1980, pp. 1–82.
Local Networks and Distributed Office Systems, vol. 1: Network Systems Development. "Impact of Microprocessor Architectures On Performance of Local Network Interface Adaptors" pp. 491–508

*Primary Examiner*—Douglas W. Olms
*Assistant Examiner*—Frank M. Scutch, III
*Attorney, Agent, or Firm*—W. Douglas Carothers, Jr.

[57] ABSTRACT

A transceiver multiplexor is adapted to receive data signals transmitted from a plurality of clustered client hosts and transmit the signals to a local area network communication medium via a transceiver coupled to the multiplexor or transmit them to any one of the client hosts. The multiplexor includes transfer means to perform this function. Collision detecting means is also provided in the multiplexor in order to determine the simultaneous occurrence of transmission between two or more client hosts and provide a collision signal to interrupt transmission from the involved client hosts. This collision detection supplements conventional collision detection at the transceiver capable of detecting transmission collisions when two or more transceivers are attempting communication on the medium but would not be capable of detecting collisions of transmitted data signals among two or more such clustered client hosts. A collision among clustered hosts connected to the multiplexor is determined from differences in data signals transmitted by two or more client hosts.

6 Claims, 3 Drawing Figures

TRANSCEIVER MULTIPLEXOR

BACKGROUND OF THE INVENTION

This invention relates generally to data communication systems and more particularly to local area networks for the transmission of data packets or signals among various transceivers coupled to a transmission medium.

A local area computer network comprises a relatively small data communication system, usually within the confines of several thousand meters, for example, for the interconnection of a plurality of terminal or user devices or hosts, e.g., workstations. The protocol scheme, operational bandwidth and specifications of the network are such that high speed communication among such devices is possible. An overall methodology is to provide hosts, each capable of performing a plurality of computer aided functions independent of any other host coupled to the network, with means to access the network toward the overall goal of intercooperative data communication and improved efficiency in the use of time in conducting business.

A local area computer network generally takes the form of one of three basic topologies, a star, ring or bus. Each such network comprises several basic components. These components include a transmission medium, two or more stations or host and an interface to couple the hosts to the medium. The host makes use of the communication system and is generally a computer. Specialized I/O devices, such as magnetic tape and disk drives, may include sufficient computing resources to function as "hosts" on a network. The transmission medium may be radio, coaxial cable, twisted wire pair or optical fiber. Repeaters may be used along the medium to extend the length of the transmission system beyond the physical contraints imposed by the medium.

The interface includes two basic components, a communication manager, e.g., a controller, and, in most cases, a transceiver. The controller for a host is the set of functions and algorithmic implementation necessary to manage host access to the medium. The basic functions include signal and data handling and transmission management, e.g., signalling conventions, encoding and decoding, serial-to-parallel conversion and vice versa; address recognition, error detection, buffering and packetization. These functions can be grouped into two logically independent sections of the controller: the transmitter and the receiver.

The transceiver contains the electronics to transmit and receive signals to and from the communication medium. A transceiver recognizes the presence of a signal when another host transmits and recognizes a collision that takes place when two or more hosts transmit simultaneously.

An example of a bus oriented local area network is called "Ethernet" and is basically disclosed in U.S. Pat. Nos. 4,063,220 and 4,282,512, assigned to the assignee herein, and is also disclosed in the publication "The Ethernet Local Network: Three Reports" published by Xerox Corporation, Feb., 1980 and in the Ethernet Specifications published Sept. 30, 1980 by Digital Equipment Corporation, Intel Corporation and Xerox Corporation. Ethernet transmission of data signals is by means of packetized data bursts. Each packet contains the identification of the source and destination of that packet, along with a data field generally containing multiple digital data items. Packets are transmitted, for example, along a 50 Ω coaxial cable at 10 Mbits/s.

The maximum operating distance between Ethernet terminals is about 2,500 meters unless extended by internetwork gateways. A host may be up to 50 meters from the backbone coaxial cable. The maximum number of hosts that may be served is essentially unlimited, providing suitable host interface techniques are employed.

Access to the cable is by contention, using a carrier-sense multiple-access with collision-detection (CSMA/CD) technique. A characteristic of this technique, as in all packet transmission networks, is that access time to the network depends on traffic load.

In Ethernet, as well as in many other local area computer networks, each host has its own transceiver which is coupled by a tap to the communication medium. In many instances, the hosts coupled to a local network are physically located very close together, such as, in the same room or common area. What would be cost effective in such instances is the coupling of several hosts to a single transceiver so that only one transceiver is needed for a group of such "clustered" hosts. In order to accomplish this advantage, some multiplexing scheme must be devised to handle not only the transmission and reception of data signals to and from a group of clustered hosts and their transceiver as well as capable of handling collision detection occurring on the transmission medium but also capable of collision detection among the several client hosts coupled to a single transceiver.

SUMMARY OF THE INVENTION

According to this invention, a transceiver multiplexor is adapted to receive data signals transmitted from a plurality of clustered client hosts and transmit the signals to a local area network communication medium via a transceiver coupled to the multiplexor or transmit them to any one of the client hosts. The multiplexor includes transfer means to perform this function. Collision detecting means is also provided in the multiplexor in order to determine the simultaneous occurrence of transmission between two or more client hosts and provide a collision signal to interrupt transmission from the involved client hosts. This collision detection supplements conventional collision detection at the transceiver capable of detecting transmission collisions when two or more transceivers are attempting communication on the medium but would not be capable of detecting collisions of transmitted data signals among two or more such clustered client hosts. A collision among clustered hosts connected to the multiplexor is determined from differences in data signals transmitted by two or more client hosts. The multiplexor collision detecting means sorts out, as not collision signals, signal outputs representative, for example, of small differences in propagation delays emanating from a single client host due to circuit idiosyncrasies.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
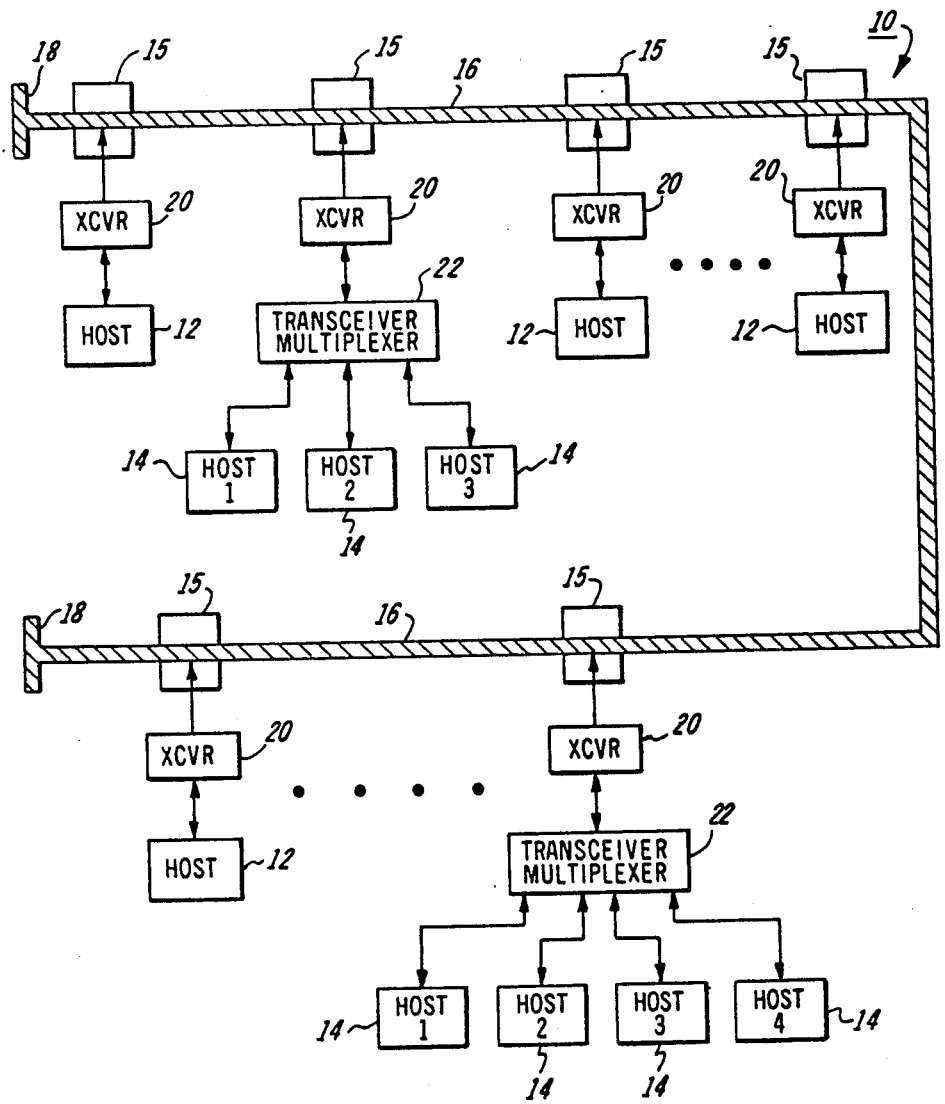
FIG. 1 is an example diagram of a local area network employing a transceiver multiplexor of this disclosure.

FIG. 1 discloses an example of a local area network 10 which comprises a plurality of communicating devices, such as hosts 12 and 14 coupled to a communication medium 16 through taps 15. Medium 16 may be, for example, a conventional coaxial cable with terminators 18 for impedance matching to limit reflections within the cable.

Each of the hosts 12 and 14 may be an intelligent terminal such as a computer or printer. Each host is coupled to the medium 16 by means of a transceiver (XCVR) 20. In the case of the single hosts 12, each host is connected to a single transceiver 20. In the case of clustered hosts 14, each of these hosts are connected to a single transceiver 20 through a transceiver multiplexor 22. In this manner, only one transceiver 20 need be utilized for a group of client hosts 14.

Figure 2A:
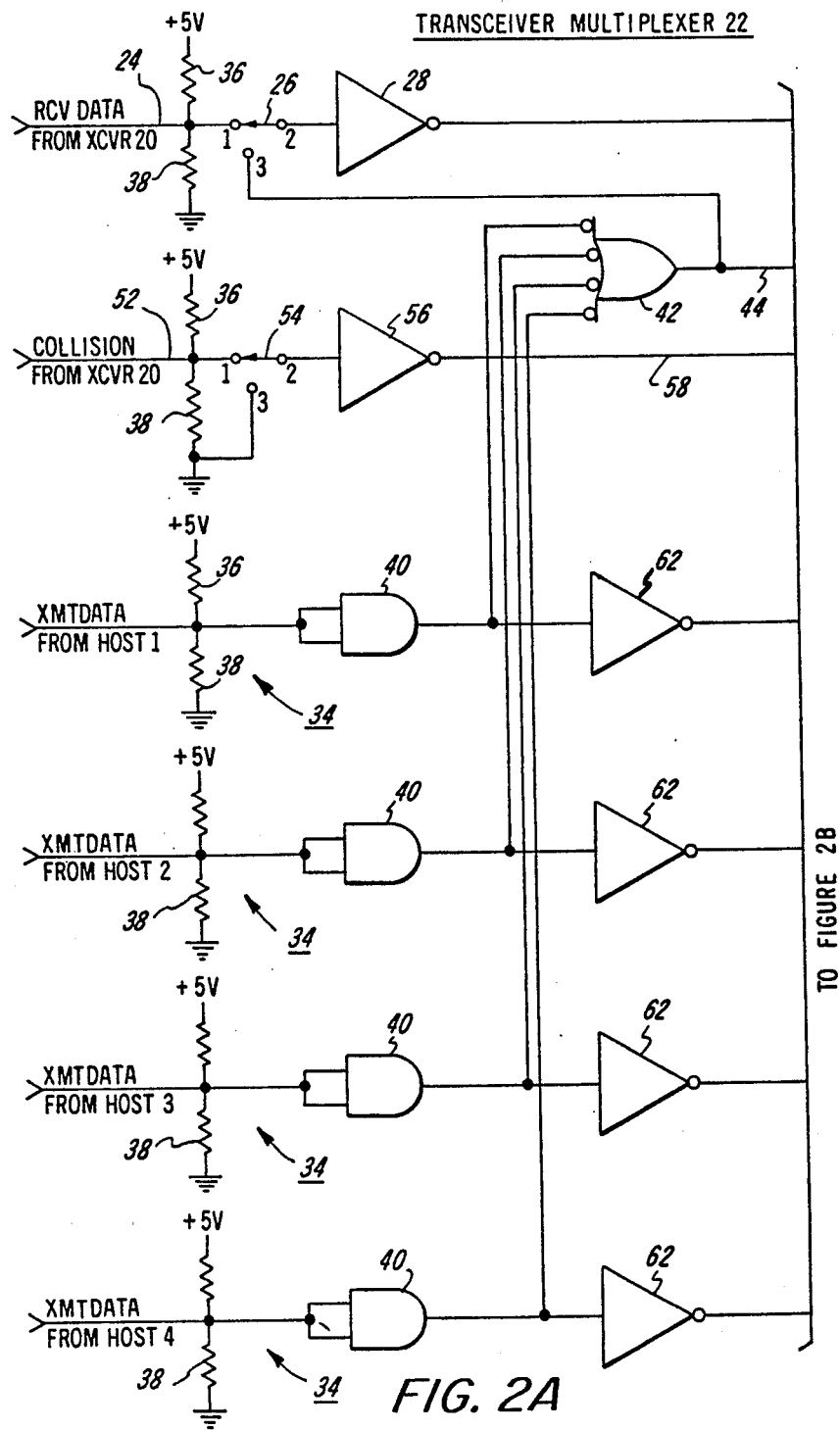
FIGS. 2A and 2B are circuit diagrams of a detailed embodiment for the transceiver multiplexor shown in FIG. 1.
Figure 2B:
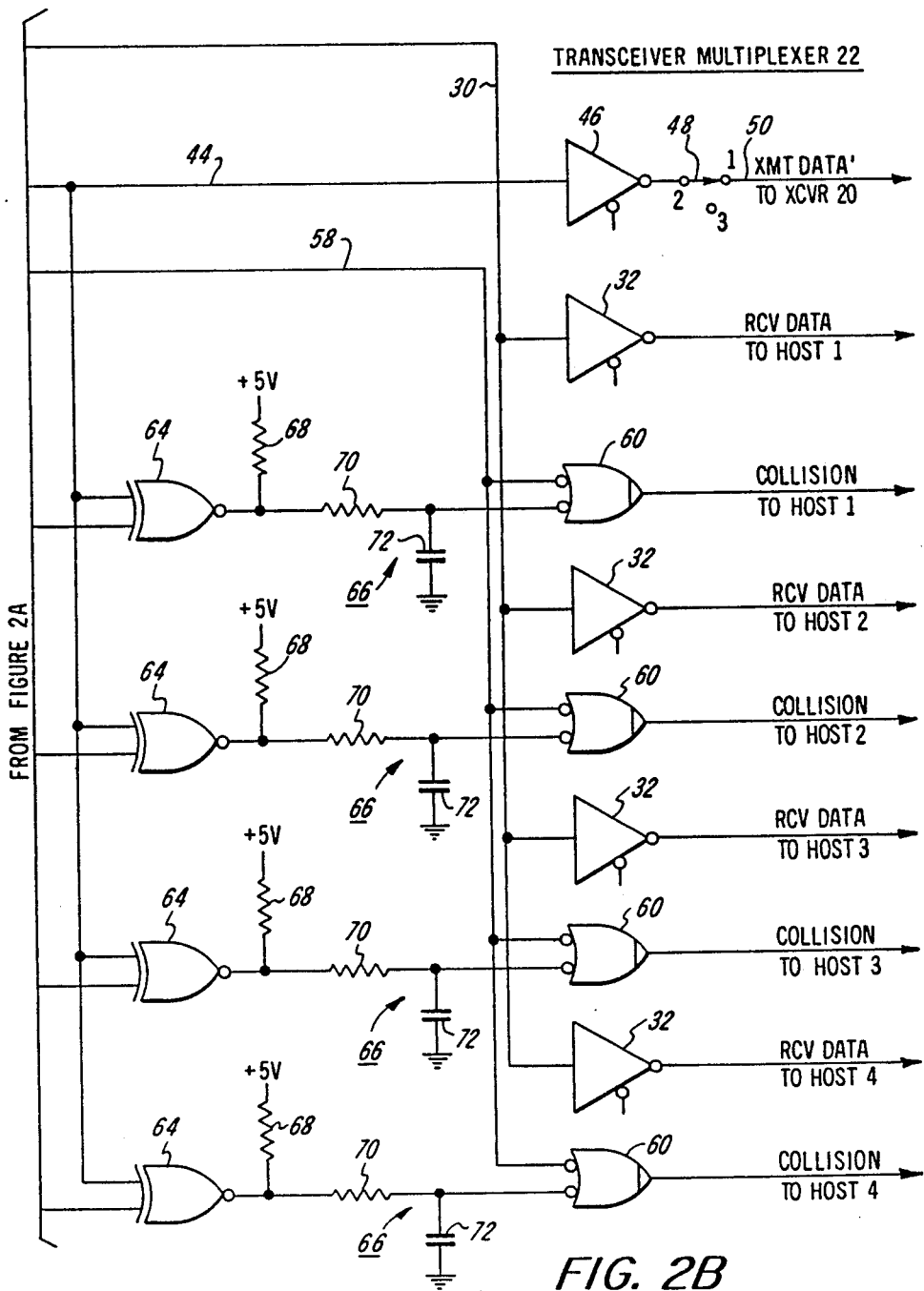

Details of the multiplexor 22 are shown in FIG. 2. In this particular illustration, four hosts 14 (host 1, host 2, host 3 and host 4) are shown coupled to multiplexor 22. Obviously more hosts or ports could be designed for coupling to the multiplexor but there is a logical limitation on how many hosts should be reasonably coupled to a single multiplexor. That limitation is reached when it is clear that due to the large number of hosts considered for connection to a single multiplexor, more efficient operation of the hosts would be achieved if individually connected to their own dedicated communicating medium. Also, multiplexor cascading can be employed, e.g., several groups of hosts may be each coupled to a multiplexor and the group of multiplexors in turn coupled to a single multiplexor.

Beside power supply lines, there are three twisted pairs of lines between each multiplexor 22 and transceiver (XCVR) 20: RCVDATA from XCVR, XMTDATA or XCVR and COLLISION from XCVR. Similarly, there are three twisted pairs of lines between each host and the multiplexor. RCVDATA from XCVR carries data packets or signals received from the medium 16 to be supplied to the phase decoder (not shown) in hosts 14. Signals on line 24 are delivered to all four hosts via triple pole, double throw switch 26, inverter 28, line 30 and host input inverters 32. A copy of all data packets received from the medium 16 is sent to each of the client hosts 14 and the intended host or hosts are capable of identifying the data packet address and proper handling of the received data. Inverter 28 serves as a line receiver for the received data and inverters 32 serve as line drivers for sending the data on to the host 14 while cancelling the inversion of inverter 28. XMTDATA to XCVR carries data packets or signals from the phase encoder (not shown) of one of the four hosts for transfer to the transceiver 20 and transmission onto the transmission medium 16. XMTDATA from one of the hosts 14 is received at a respective line receiver 34 comprising a pair of terminator resistors 36 and 38 and an AND gate serving as a noninverting buffer 40. The two resistors terminate the twisted pair of wires in its characteristic impedance to prevent reflections. Terminator resistors 36 and 38 are also provided for twisted pairs of lines 24 and 52.

The output of AND gates 40 are connected as the four inputs of transfer OR gate 42 which delivers the transmitted data signal from any one of the client hosts 14 to the transceiver 20 via line 44, driver/inverter 46 and triple-pole, double-throw switch 48 and thence line 50 to transceiver 20. Driver inverter 46 is employed to reinvert the inverted signal at the OR gate 42 as well as drive the signal to the transceiver 20.

For collisions detected between one or more hosts attempting access to the communication medium 16, collision detection is handled in the conventional manner, as disclosed in U.S. Pat. No. 4,063,220. The COLLISION signal is received on line 52 from transceiver 20. The COLLISION signal is sent to each of the four client hosts via triple-pole, double-throw switch 54, inverter 56, line 58 and OR drivers 60. Thus, a COLLISION signal is supplied from the transceiver 20 to each of the client hosts 14 to indicate that a signal collision has occurred involving transceiver 20 of multiplexor 22 and one or more other transceivers elsewhere coupled to transmission medium 16.

In addition, collisions must be detected among the four client hosts vis-a-vis transmission medium collisions. This is the function of the inverters 62, exclusive NOR gates 64 and the glitch suppressors 66. The output of each line receiver 34 from a client host is connected to the input of an inverter 62, with the output of each respective inverter 62 connected as one input to a respective exclusive NOR gate 64. The other input of each of the gates 64 is connected to the output of the transfer OR gate 42 via line 44.

The gates 64 compare the data signals received from a respective client host with data signals supplied via transfer OR gate 42. If only one of the four client hosts is transmitting, the comparison made at an exclusive OR gate 64 will be substantially identical because the data at both inputs to the gate 64 will be actually the same. Thus, if there is a fairly perfect match of the data signal being transmitted by a particular client host and handled via both inverter 62 and transfer OR gate 42, the output of gate 64 will remain in its logic high state and no collision signal will be provided at its output. However, if more than one of the client hosts is transmitting simultaneously, the data signal being supplied to transceiver 20 will be the OR value of the combined data signal streams from the transfer OR gate 42. This ORed output on line 44 will not be identical with any of the individual data signal streams transmitted by the colliding client hosts received at the other input of the exclusive OR gates 64 of involved client hosts. With very high probability no two client hosts will be transmitting, by coincidence, identical data signals. The logic low output of the exclusive NOR gate 64 in such a case represents a multiplexor collision signal which is forwarded to the involved client hosts via its respective driver 60.

The function of the inverters 62 is to delay the data signals to the input of the gates 64, i.e., their function is to delay the data signal since the data signals to arrive at the other input of each of these gates will experience a similar delay through OR gate 42. The inputs to each of the gates 64 would not arrive at the same time unless an artificial delay is present at both inputs to the gates 64. Also, since the output of OR gate 42 has been inverted, so the artificial delay via the path of inverters 62 must also be inverted.

The resistors 68 coupled at the output of exclusive NOR gates 64 serve as pull-up resistors for the open collector output stages of these gates.

It is not necessary that the delay in either path via gate 42 or inverters 62 to the inputs of gates 64 be exactly the same as long as they are within a few nanoseconds of one another. In fact, with the delay inverters 62 present, there will still be slightly different propagation delays at the respective inputs to gates 64 due to circuit idiosyncrasies.

In fact, in actual operation, the inputs to the exclusive OR gates 64 will usually differ by a few nanoseconds in the case where only a single client host is transmitting a data signal. The output produced by gate 64 in such instances is termed a "glitch" which occurs for a few nanoseconds, e.g., an upper limit of possibly 30 nanoseconds. Such an output signal does not represent a true collision and should be ignored. Only if the change of state at the output of a gate 64 lasts for a predetermined period of time should its output be recognized as a client host collision. Anything else of lessor time difference will be treated as noise. The glitch suppressor 66 eliminates these glitches. It may comprise an RC low pass filter consisting of series resistor 70 and coupling capacitor 72. Any output from gate 64 representing a minimal signal time difference will be filtered out by suppressor 66 so that no change appears at the input to driver gate 60, i.e., no multiplexor collision will be indicated to have occurred.

The embodiment disclosed for multiplexor 22 is designed for a 3 Mbit local area network. However, the principal of operation is basically the same for higher bandwidths, such as 10 Mbit/sec.

An example of the circuit components for fabrication of the multiplexor 22 are listed in the Table below. In all cases, the parts numbers are standard Texas Instrument catalog numbers except for chip components as noted.

| Table of Circuit Components | |
|---|---|
| Components | Part Number Or Value |
| Inverter 28 | 74LS04 |
| Inverter 32 (Signetics) | 8T98 |
| AND Gate 40 | 74LS08 |
| Or Gate 42 | 74LS20 |
| Inverter 46 (Signetics) | 8T98 |
| Inverter 56 | 74LS04 |
| OR Gate 60 | 74LS38 |
| Inverter 62 | 74LS04 |
| Exclusive NOR Gate 64 | 74LS266 |
| Resistors 36, 38 & 70 | 150 Ohms |
| Resistors 68 | 510 Ohms |
| Capacitors 72 | 200 pf |

What has been described is a transceiver multiplexor that may reduce the cost of installation of clustered hosts to be coupled to a local area network. A multiplexor is considerably simpler in design and costs less than a transceiver under present technology. A useful installation is the case of several hosts in the same room. In the case of transmission of data between these clustered hosts, the communication medium and the network transceiver can be eliminated altogether and the multiplexor itself can serve as a "virtual local area network". This is accomplished by switches 26, 48 and 54 being switched to their other pole position.

While the invention has been described in conjunction with specific embodiments, it is evident that many alternatives, modifications and variations will be apparent to those skilled in the art in light of the foregoing description. Accordingly, it is intended to embrace all such alternatives, modifications, and variations as fall within the spirit and scope of the appended claims.

What is claimed is:

1. A transceiver multiplexor adapted to receive data signals from any one of a plurality of client hosts and transmit them to a communication medium via a transceiver coupled thereto or to any of said client hosts and comprising means coupled to receive a transmitted data signal from any transmitting client host, transfer means coupled to said coupling means to receive said transmitted data signal from any one of said hosts for transfer as an output to said transceiver, collision detecting means each having one input coupled to an output of a respective client host to receive a transmitted data signal directly from its respective coupling means, and having its other input coupled to receive said transmitted data signal output from said transfer means, the output of each of said collision detecting means coupled as an input to its respective client host, delay means in said collision detecting means to roughly match the propagation delay through said transfer means, any one of said collision detecting means productive of a collision signal when the time phase of said signals presented at said collision detecting means inputs are not substantially the same over a predetermined minimum time period.

2. The transceiver multiplexor of claim 1 wherein said collision detecting means comprises an exclusive OR means connected to a suppressor means, said suppressor means adapted to eliminate short term outputs from said exclusive OR means up to a predetermined value and representative of small propagation delays of substantially identical data signals present at both inputs of said exclusive OR means.

3. The transceiver multiplexor of claim 1 wherein said suppressor means is a low pass RC filter.

4. In a local area network communication system including a transmission medium and a plurality of transceivers connected to said medium to transmit and receive data signals communicated over said medium, a transceiver multiplexor coupled to one of said transceivers and to a plurality of client hosts and having means to receive transmitted data from any of said clients for transfer to said one transceiver for transmission onto said medium and to receive transmitted data from said one transceiver for transfer to any one of said client hosts, first collision detecting means in said transceiver for generating a first collision signal whenever a data signal communicated on said medium by another transceiver is received by the subject transceiver during the time said subject transceiver is transmitting a signal onto said medium, second collision detecting means in said multiplexor for generating a second collision signal whenever a data signal communicated by one of said client hosts to said subject transceiver via said multiplexor is communicated during the time another data signal is being communicated by another of said client hosts, both of said collisions signals coupled to said client hosts to interrupt the transmission of a data signal by any one of said client hosts, said second collision detecting means comprises delay means connected to receive data being transmitted by a respective client host, signal generator means connected to receive at its inputs said data signal from said delay means and from said multiplexor, said signal generator means productive of said second collision signal when the magnitude of the difference in the signals at said inputs is greater than the difference encountered at its inputs due to propagation delays of a substantially identical data signal present at both of its inputs.

5. In the local area network communication system of claim 4 wherein said signal generator means comprises an exclusive OR gate means connected to a low pass filter, said filter adapted to eliminate short term outputs up to a predetermined value and representative of small propagation delays of substantially identical data signals present at both inputs of said exclusive OR means.

6. In the local area network communication system of claim 5 wherein said low pass filter is an RC network.

* * * * *